United States Patent [19]
Arnold et al.

[11] Patent Number: 5,279,185
[45] Date of Patent: Jan. 18, 1994

[54] BEVEL GEAR SUPPORT WITH FLUID BEARINGS FOR RADIAL PISTON HYDROSTATIC MACHINE

[75] Inventors: George D. M. Arnold; Christian H. Thoma, both of Jersey, Great Britain

[73] Assignee: Unipat AG, Glarus, Switzerland

[21] Appl. No.: 947,758

[22] Filed: Sep. 9, 1992

[51] Int. Cl.$^5$ ............................................. F16D 39/00
[52] U.S. Cl. ...................... 74/606 R; 91/486
[58] Field of Search ............. 475/83; 60/487; 91/486, 91/494; 92/72, DIG. 1, DIG. 2, 384/118, 292; 74/606 R

[56] References Cited

U.S. PATENT DOCUMENTS

| | | | |
|---|---|---|---|
| 3,432,214 | 3/1969 | Cashman et al. | 384/292 |
| 3,721,161 | 3/1973 | Bobst | 92/DIG. 2 X |
| 4,684,318 | 8/1987 | Mulders | 384/118 X |
| 4,788,902 | 12/1988 | Akasaka et al. | 91/486 |
| 5,078,659 | 1/1992 | Von Kaler et al. | 475/78 |
| 5,094,144 | 3/1992 | Akasaka et al. | 91/486 |

*Primary Examiner*—Leslie A. Braun
*Assistant Examiner*—Khoi Ta
*Attorney, Agent, or Firm*—Young & Thompson

[57] ABSTRACT

A radial piston hydrostatic machine disposed in a housing, a drive shaft supported in the housing and connecting through bevel pinion and gear to transmit rotation of the shaft to a cylinder barrel. The cylinder barrel provided with generally radial cylinder bores supporting pistons and mounted to rotate on a stationary ported pintle valve fixed to said housing. The cylinder barrel having an axially extending projection to support the bevel gear in spaced relationship with the end of said cylinder barrel, the bevel gear rotating with said cylinder barrel and drivingly connected to said bevel pinion. Fluid bearing means provided on the outer cylindrical surface of said pintle valve to provide a pressure field under said axially extending projection in order to counter any deflection of said bevel gear.

4 Claims, 2 Drawing Sheets

BEVEL GEAR SUPPORT WITH FLUID BEARINGS FOR RADIAL PISTON HYDROSTATIC MACHINE

BACKGROUND OF THE INVENTION

1. Field of the Invention

The present invention relates to hydrostatic radial piston machines and, more particularly, is concerned with the driving means to power such machines.

2. Description of the Prior Art

Hydrostatic machines convert rotary mechanical motion, typically from an internal combustion engine, to fluid motion in the case of a hydraulic pump, whereas when the pump is combined to a hydraulic motor as in a hydrostatic transmission, fluid motion is converted back to mechanical motion to rotate for example, a drive axle of a vehicle such as a lawn and garden tractor.

The hydrostatic machine operating as a pump regulates or controls the flow output such that varying rates of fluid flow are attainable with a single speed input rotary mechanical motion. Within the hydrostatic machine of the radial piston type, a cylinder barrel rotates on a fixed pintle valve with pistons positioned within the cylinders and attached to slippers such that as the cylinder barrel rotates, the pistons engages a surrounding annular track ring. When the track ring is set in eccentric relationship with the pintle valve, the pistons displace fluid from their respective cylinders and the fluid is expelled from the hydrostatic machine. The rate of fluid delivered is therefore directly proportional to the eccentricity of the track ring of the machine relative to the pintle valve.

The eccentricity of the pump track ring must therefore be variable and this, for example, can be accomplished by pivotting the track ring around an axis located at one end of the track ring, the axis definer generally being a pivot pin. In addition, a control mechanism adapted to swing or pivot the track ring around the pivot axis must also be provided allowing the eccentricity of the track ring to be changed. Such a hydrostatic machine is shown in U.S. Pat. No. 5,078,659, entitled VARIABLE SPEED TRANSAXLE, issued Jan. 7, 1992, which is specifically incorporated herein by reference.

The hydrostatic transmission is totally encapsulated inside a purposely formed internal chamber inside the transaxle housing structure, and comprises a hydraulic pump is fluidly coupled to the hydraulic motor. The motor is connected through reduction gearing and differential to the output axle shafts on which the wheels of the vehicle are attached.

A bevel pinion gear attached and driven by the vertically aligned input shaft of the transaxle is used in combination with a larger bevel gear and engaged by drive dogs to the cylinder barrel of the hydraulic pump. The bevel gear is supported by means of a bearing on the cylindrical pintle valve.

During the development of the hydrostatic transaxle, it was found that a serious problem existed due to the excessive tilting or deflection of the bevel gear during power transmission. This not only resulted in poor operating efficiency, but on occasion was so severe that the cylinder barrel seized onto the pintle valve.

SUMMARY OF THE INVENTION

The present invention solves the problem by providing an projection to the cylinder barrel on which the bevel gear is supported. Driving means such as screws are used to hold the bevel gear to the cylinder barrel so that they rotate in unison.

This projection has the advantage in being part of the cylinder barrel that any deflection of the bevel gear is resisted in great part by the stiffness of the hydrostatic bearing between the pintle valve and cylinder barrel.

It is further an advantage of the present invention when a spiral groove is included on the outer cylinderical surface of the pintle valve in a position under the projection of the cylinder barrel. The direction of the spiral being such that rotation of the cylinder barrel causes fluid to be drawn up the spiral groove along the longitudinal axis of the pintle valve in order that a pressurized bearing is created. This pressure bearing further helps to counter any deflecting tendancy of the bevel gear.

BRIEF DESCRIPTION OF THE DRAWINGS

The above mentioned and other features and objects of the invention, and the manner of attaining them, may be performed in various ways and will now be described by way of examples with reference to the accompanying drawings, in which.

Figure 1:
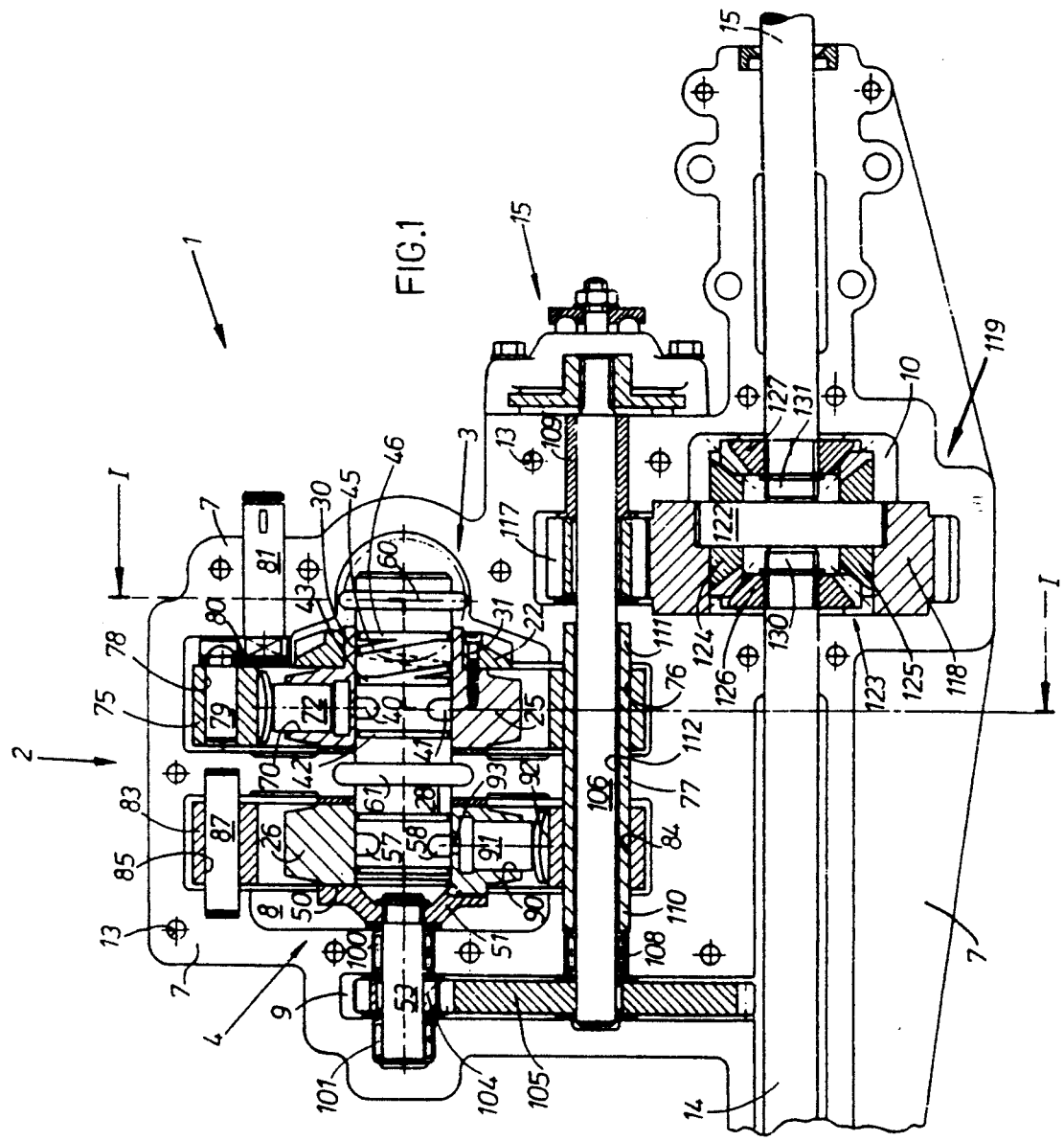
FIG. 1 is a plan view downwards of a further embodiment of the transaxle according to the invention, where the upper housing element is removed to show the internal components.
Figure 2:
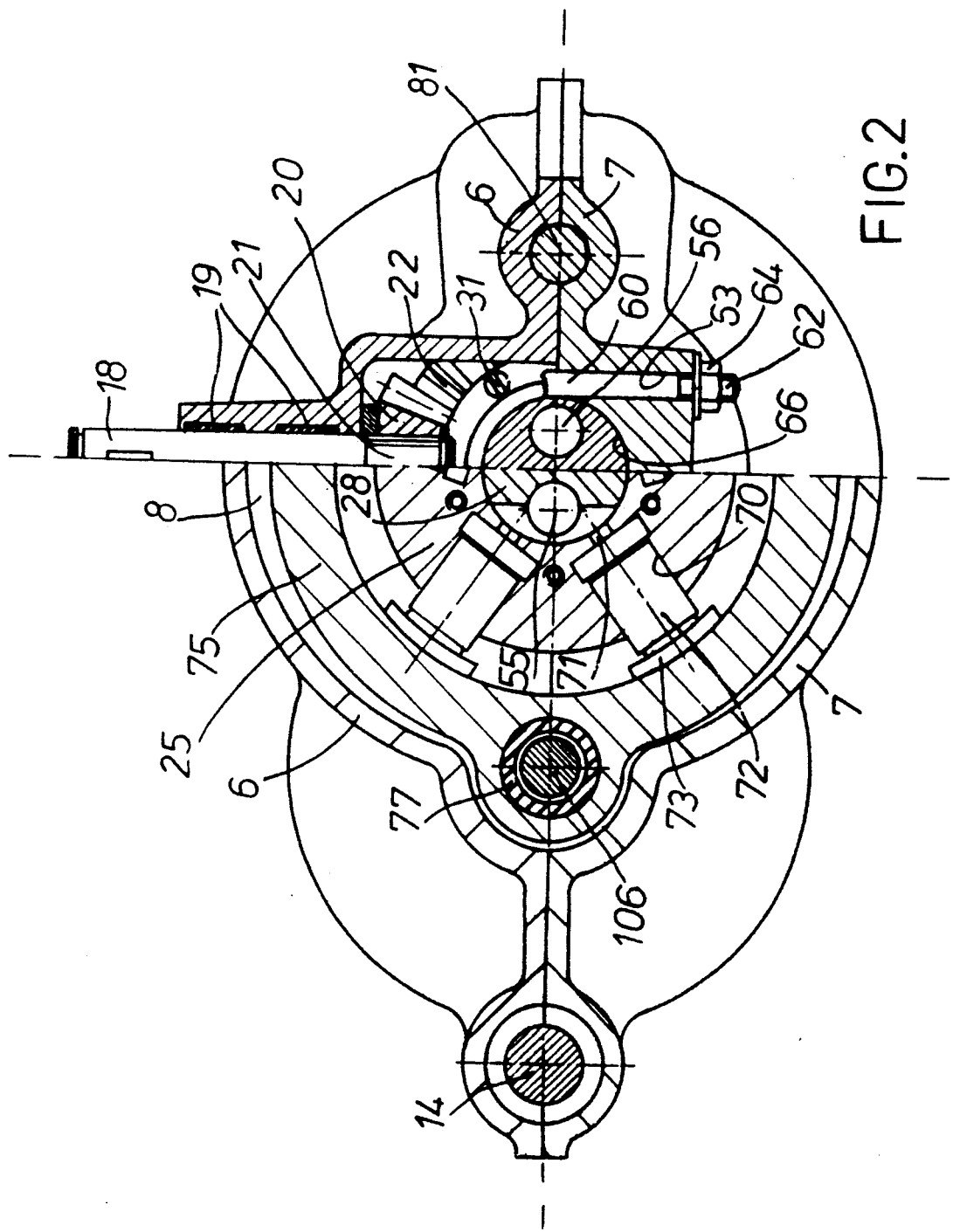
FIG. 2 is a part sectioned side view on line I—I of FIG. 1 of the transaxle as viewed from the right-hand side.

The hydrostatic transaxle 1 includes an internally disposed hydrostatic transmission 2 comprising a hydraulic pump 3 fluidly coupled to a hydraulic motor 4.

Upper and lower housing elements 6, 7 enclose the hydrostatic transmission 2 in a chamber 8 which is flooded with hydraulic fluid. Furthermore, housing elements 6, 7 also form chambers 9, 10 for the differential and gear reduction.

The housing elements 6, 7 are attached together by a plurality of self-threading screws which are inserted through holes in the upper housing element 6 and engage with bottom-ended holes 13 provided in the lower housing element 7. Preferably, the housing elements 6, 7 are separable at a parting plane generally containing the longitudinal axes of the output axle shafts 14, 15.

Sealing compound of the anaerobic type is applied over the top surface of housing element 7, such that once the two housing elements 6, 7 are fixed together, and in the absence of air, the sealing compound cures and a fluid tight seal is obtained.

An input shaft 18 is supported in housing element 6 by means of bearings 19. Input shaft 18 protrudes through the housing element 6 on both sides, externally of the transaxle 1 where it engages for example, a belt driven pulley, and internally, where the shaft 18 passes into chamber 8 to engage to a bevel pinion gear 20, the gear 20 being splined 21 to the end of input shaft 18.

Pinion gear 20 meshes with bevel gear 22, such gearing allows the axis of rotation to be turned through ninety degrees from the vertical orientated input shaft 18 to the horizontal axis of respective pump 3 and motor 4 cylinder barrels 25, 26.

Cylinder barrels 25, 26 are mounted for rotation on a stationary pintle valve 28 which is fixed to housing element 7, the pintle valve 28 acting as a fluid conduit member for fluidly connecting the pump 3 and motor 4 together.

A projection 30 is provided in cylinder barrel 25 of the pump 3 which extends from one end of the cylinder barrel 25. Onto this projection 30, the bevel gear 22 is supported, and where fixing means such as screws 31 are used to firmly attach the bevel gear 22 to the cylinder barrel 25.

Arcuate slots 40, 41 and pressure field defining circumferential grooves 42, 43 provide the usual hydrostatic fluid bearing between the pintle valve 28 and the cylinder barrel 25, although in this invention, the hydrostatic bearing now also helps provide some resistance to the tipping loads induced on this component by the bevel gear 22.

Further support to counter such undesirable influences of the bevel gear 22 is provided by including a spiral groove 45 on the cylindrical surface of the pintle valve 28. The spiral groove 45 starts from circumferential groove 43 and ends at a further circumferential groove 46 which is located just short of the termination point of the projection 30.

As the cylinder barrel 25 of the pump 3 always rotates in the same direction (in contrast to the hydraulic motor which must be able to rotate in both direction in the vehicle is able to travel forwards and backwards), during rotation of the cylinder barrel 25 and integral projection 30 over the spiral groove 45, a pumping action is created and the fluid in the spiral groove 45 is displaced along the longitudinal axis of the pintle valve 28 beginning at circumferential groove 43 and ending at circumferential groove 46. As a result, this area of the pintle valve 28 directly under the projection 30 becomes pressurized with fluid and thereby increases the stiffness of the complete bearing against any undesirable loadings induced by the bevel gear 22.

What is thereby achieved is a very stiff and effective bearing member, that is capable of operating under high loads efficiently and able to prevent deflection of the bevel gear.

In the case of the cylinder barrel 26 of the hydraulic motor 4, only a slot 50 is required at one end into which coupling 51 is engaged. The coupling 51 takes care of any misalignment that may exist between the axes of the cylinder barrel 26 and first deceleration shaft 53.

Hydraulic pump 3 and motor 4 are mounted co-axially in back-to-back relationship so that their rotating axis is parallel with that of the axle output shafts 14, 15.

Two galleries 55, 56 are provided in the pintle valve 28, gallery 56 connecting arcuate slot 40 in the pump 3 to arcuate slot 57 in the motor 4, whereas gallery 55 connecting arcuate slot 41 in the pump 3 to arcuate slot 58 in the motor 4.

Pintle valve 28 is rigidly secured to the lower housing element 7 of the transaxle 1 by combined means of two "U" bolt type clamps 60, 61. The ends 62 of both bolts 60, 61 are threaded and pass through holes 63 in the lower housing element 7 so that a nut 64 can be spun on the threaded ends 62 and tightened thereby resulting in pintle valve 28 being held firmly down in channel 66 formed in the lower housing element 7.

Although not visible, check valves are provided in the end of galleries 55, 56 in pintle valve 28 in order that fluid can be drawn into said galleries when required as described in U.S. Pat. No. 4,686,829.

The cylinder barrel 25 of the pump 3 is provided with a plurality of cylinders 70 which are a fixed axial distance relative to the arcuate shaped slots 40, 41 in the pintle valve 28. Each cylinder 70 includes a port 71 which matches with arcuate slots 40, 41 during rotation of cylinder barrel 25.

Each cylinder 70 receives a piston 72 which is attached to a slipper 73 by retaining means such as a rivet (not visible), these components rotating according to the cylinder barrel 25 within a surrounding annular track ring 75, and where the slippers 73 act against the track ring 75.

If track ring 75 of pump 3 is adjusted so as to be in an eccentric relationship to pintle valve 28, during rotation of the cylinder barrel 25 with its piston 72 and slipper 73 members, the pistons 72 are causes to reciprocate radially within their respective cylinders 70 and fluid inside the cylinders 70 is displaced.

The hydraulic pump 3 is therefore arranged to be capable of adjustment so as to vary its fluid output capacity and thus the speed ratio of the hydrostatic transmission 2. This is achieved by providing a hole 76 in track ring 75, and by means of supporting track ring 75 on tube 77 which acts as the pivot point for track ring 75. Tube 77 extends through track ring 75 and is supported between the housing elements 6, 7.

Tube 77 is fixed in position relative to pintle valve 28 while track ring 75 has a limited ability to rotate, the tube 77 being aligned generally parallel to the rotary axis of the hydrostatic pump 3.

Track ring 75 is provided with a hole 78 into which a projecting pin 79 is inserted which engages through an adjusting arm 80 to the control shaft 81.

Projecting pin 79 and adjusting arm 80 allow movement of the control shaft 81 and translates the rotary movement of an externally operated lever (not shown) engaged by a key to the control shaft 81, into lateral swinging movement of the track ring 75.

For the hydraulic motor 4, track ring 83 remains in permanent eccentric relationship to the pintle valve 28. The track ring 83 is provided with two holes 84, 85, and where tube 77 is inserted through hole 84 whereas pin 87 is inserted through hole 85. As a result, once the housing elements 6, 7 are attached together, both tube 77 and pin 87 are held fast between the housing elements and thus the track ring 83 cannot move.

Cylinder barrel 26 of hydraulic motor 4 comprises a plurality of cylinders 90 each receiving a piston 91. Pistons 91 are attached to slippers 92, and both rotate according to the cylinder barrel 26 within track ring 83.

Movement of lever by the vehicle operator causes the control shaft 81 to rotate, and by means of arm 80 and pin 79, track ring 75 pivots through a small angle on tube 77. A degree of eccentricity of the track ring 75 is produced and thus, the effective fluid output capacity of the hydrostatic pump 3 is altered. Fluid under pressure is received by the hydraulic motor 4 and acts behind pistons 91 in cylinders 90 causing piston 91 to reciprocate radially within its cylinder 90. As track ring 83 is mounted eccentric to the pintle valve 28, a turning action is created and rotation of the cylinder barrel 26 occurs which is then transmitted via coupling 51 to first deceleration shaft 53.

Shaft 53 is rotatably supported on two bearings 100, 101 which are located in pockets formed in the housing elements 6, 7. Gear 104 is keyed to shaft 53 and meshes with gear 105 which is keyed to second deceleration shaft 106.

Shaft 106 is rotatably supported on bearings 108, 109 and is arranged to pass through tube 77. The ends 110, 111 of tube 77 are supported directly between housing elements 6, 7 and a small annular clearance 112 is provided in order to prevent shaft 106 from touching the inside of tube 77.

Shaft 106 is extended to protrude from the transaxle 1 in order that a vehicle parking brake 115 can be included. A pinion gear 117 is keyed to shaft 106 and arranged to mesh with ring gear 118 of the differential 119.

Differential 119 comprises ring gear 118, drive centre pin 122, and bevel gear assembly 123. Bevel gear assembly 123 includes bevel gears 124, 125 and bevel gears 126, 127 which together with drive centre pin 122 are carried within the interior of ring gear 118 in a manner which is known in the art. Proximal ends 130, 131 of output axle shafts 14, 15 respectively, are received through bevel gears 126, 127 and abut against drive centre pin 122.

Bevel gear assembly 123 of the differential 119 acts to transmit the drive from the ring gear 118 to the output axle shafts 14, 15 and drive wheels of the vehicle as known to those skilled in the art. The inclusion of a differential is important as it allows normal differentiation between the left and right drive wheels of the vehicle and helps prevent lawn damage especially when tight turns are undertaken.

By appropriate selection and movement of the speed control lever vehicle operator adjusts the eccentricity of track ring 75 of the hydraulic pump 3. As a result, the speed ratio of the hydrostatic transmission 2 is changed, as for example, for forward motion of the vehicle, rotation of the input shaft 18 drives through the bevel pinion 20 and gear 22 to rotate the cylinder barrel 25 of the hydraulic pump 3.

Rotation of cylinder barrel 25 and the consequent radial reciprocating action of pistons 72, causes fluid to flow out from cylinder 70 through port 71 into arcuate slot 55 in pintle valve 28.

The fluid flows along gallery 55 the pintle valve 28 and towards the hydraulic motor 4, and out through arcuate slot 58 and into port 93 in the cylinder barrel 26 of hydraulic motor 4.

The fluid entering cylinder 90 acts against piston 91 causing it to move radially outwards. As a consequence of track ring 83 being eccentrically mounted relative to the pintle valve 28, the engaging slipper 92 acts through an angle, and the force from the pressurized oil acting behind the piston 91 and angled slipper 91, produces a turning moment to the cylinder barrel 26 of the hydraulic motor 4.

Rotating of cylinder barrel 26 is transmitted through gears 104, 105, 117 to the ring gear 118 of the differential 119 and the associated bevel gear assembly 123, which acts to transfer mechanical power to the axle output shafts 14, 15 and the drive wheels of the vehicle.

It is to be understood that while we have illustrated and described an embodiment for our invention, it is not to be limited to any one specific form or arrangement of parts herein described and shown except insofar as such limitations are included in the claims.

We claim:

1. A housing formed with an internal chamber for an internally disposed radial piston hydrostatic machine;
    a power transmission shaft supported in said housing and protruding into said chamber to connect with a bevel pinion gear;
    a cylinder barrel provided with generally radial cylinder bores and mounted to rotate on a stationary ported pintle valve fixed to said housing, said cylinder barrel having means supporting a bevel gear in spaced relationship at an axial end of said cylinder barrel and means for rotation of said bevel gear with said cylinder barrel, said bevel gear drivingly connected to said bevel pinion gear.

2. A housing of claim 1 wherein the means supporting said bevel gear comprises an axially extending projection, and bearing means provided on said pintle valve to provide a fluid pressure field under said axially extending projection.

3. A housing of claim 2 wherein said bearing means comprises a spiral groove for transferring pressurized fluid along the longitudinal axis of said pintle valve.

4. A housing of claim 3 wherein the action of rotation of said cylinder barrel causes hydraulic fluid to be displaced in said spiral groove.

* * * * *